(12) United States Patent
Calley

(10) Patent No.: US 7,876,019 B2
(45) Date of Patent: *Jan. 25, 2011

(54) ELECTRICAL DEVICES WITH REDUCED FLUX LEAKAGE USING PERMANENT MAGNET COMPONENTS

(75) Inventor: David Gregory Calley, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 64 days.

This patent is subject to a terminal disclaimer.

(21) Appl. No.: 12/149,935

(22) Filed: May 9, 2008

(65) Prior Publication Data

US 2008/0309188 A1  Dec. 18, 2008

Related U.S. Application Data

(60) Provisional application No. 60/924,328, filed on May 9, 2007, provisional application No. 61/064,162, filed on Feb. 20, 2008, provisional application No. 61/064,161, filed on Feb. 20, 2008.

(51) Int. Cl.
*H02K 21/14* (2006.01)

(52) U.S. Cl. ............. 310/263; 310/156.66; 310/156.67; 310/156.68; 310/156.73; 310/156.72; 310/257; 310/266

(58) Field of Classification Search ................................ 310/156.66–156.73, 49.02, 49.05, 49.15–49.17, 310/49.42, 266, 263, 257, 178, 181
See application file for complete search history.

(56) References Cited

U.S. PATENT DOCUMENTS 1,361,136 A  12/1920  Burke
2,078,668 A  4/1937  Kilgore
3,403,273 A *  9/1968  Higuchi ..................... 310/41
3,437,854 A  4/1969  Oiso
3,558,941 A  1/1971  Viscount Brebbia et al.
3,700,942 A  10/1972  Alth
3,710,158 A  1/1973  Bachle et al.

(Continued)

FOREIGN PATENT DOCUMENTS

DE  1513856  4/1969

(Continued)

OTHER PUBLICATIONS

Hasubek, B. E. et al.; "Design Limitations of Reduced Magnet Material Passive Rotor Transverse Flux Motors Investigated using 3D Finite Element Analysis"; 2000; pp. 365-369.

(Continued)

*Primary Examiner*—Karl I Tamai
*Assistant Examiner*—Terrance Kenerly
(74) *Attorney, Agent, or Firm*—Snell & Wilmer L.L.P.

(57) ABSTRACT

A device for generating electrical or mechanical output, comprising a stator coil, a stator assembly, a rotor coil, a rotor assembly rotational about an axis, the rotor assembly at least partially surrounding the rotor coil, rotator extensions capable of induced magnetization and extending from the rotator, each rotator extension having a rotor extension surface, wherein magnetic flux leakage between the rotator extension surfaces is prevented or reduced via permanent magnet elements located at the rotator extension surfaces. Stator and rotor may be reversed in operation.

15 Claims, 6 Drawing Sheets

U.S. PATENT DOCUMENTS

| | | | |
|---|---|---|---|
| 3,774,059 A | 11/1973 | Cox | |
| 4,021,691 A | 5/1977 | Dukshtau et al. | |
| 4,114,057 A | 9/1978 | Esters | |
| 4,206,374 A | 6/1980 | Goddijn | |
| 4,237,396 A | 12/1980 | Blenkinsop et al. | |
| 4,255,684 A | 3/1981 | Mischler et al. | |
| 4,363,988 A * | 12/1982 | Kliman | 310/268 |
| 4,388,545 A | 6/1983 | Honsinger et al. | |
| 4,392,072 A | 7/1983 | Rosenberry | |
| 4,459,501 A | 7/1984 | Fawzy | |
| 4,501,980 A | 2/1985 | Welburn | |
| 4,605,874 A | 8/1986 | Whiteley | |
| 4,611,139 A | 9/1986 | Godkin et al. | |
| 4,620,752 A | 11/1986 | Fremerey et al. | |
| 4,658,166 A | 4/1987 | Oudet | |
| 4,794,286 A | 12/1988 | Taenzer | |
| 4,797,602 A | 1/1989 | West | |
| 4,835,840 A | 6/1989 | Stokes | |
| 4,850,100 A | 7/1989 | Stokes | |
| 4,900,965 A | 2/1990 | Fisher | |
| 4,959,577 A | 9/1990 | Radomski | |
| 5,038,066 A | 8/1991 | Pawlak et al. | |
| 5,051,641 A | 9/1991 | Weh | |
| 5,097,167 A | 3/1992 | Kanayama et al. | |
| 5,117,142 A | 5/1992 | von Zweygbergk | |
| 5,130,595 A | 7/1992 | Arora | |
| 5,132,581 A | 7/1992 | Kusase | |
| 5,177,054 A | 1/1993 | Lloyd | |
| 5,208,503 A | 5/1993 | Hisey | |
| 5,212,419 A | 5/1993 | Fisher et al. | |
| 5,250,865 A | 10/1993 | Meeks | |
| 5,262,746 A | 11/1993 | Masuda | |
| 5,278,470 A | 1/1994 | Neag | |
| 5,289,072 A | 2/1994 | Lange | |
| 5,306,977 A | 4/1994 | Hayashi | |
| 5,382,859 A | 1/1995 | Huang et al. | |
| 5,386,166 A | 1/1995 | Reimer et al. | |
| 5,530,308 A | 6/1996 | Fanning et al. | |
| 5,543,674 A | 8/1996 | Koehler | |
| 5,543,677 A | 8/1996 | Fakler | |
| 5,633,551 A | 5/1997 | Weh | |
| 5,650,680 A | 7/1997 | Chula | |
| 5,712,521 A | 1/1998 | Detela | |
| 5,729,065 A | 3/1998 | Fremery et al. | |
| 5,731,649 A | 3/1998 | Caamano | |
| 5,773,910 A | 6/1998 | Lange | |
| 5,777,418 A | 7/1998 | Lange et al. | |
| 5,780,953 A | 7/1998 | Umeda et al. | |
| 5,814,907 A | 9/1998 | Bandera | |
| 5,886,449 A | 3/1999 | Mitcham | |
| 5,889,348 A | 3/1999 | Mühlberger et al. | |
| 5,894,183 A | 4/1999 | Borchert | |
| 5,925,965 A | 7/1999 | Li et al. | |
| 5,942,828 A | 8/1999 | Hill | |
| 5,973,436 A | 10/1999 | Mitcham | |
| 5,994,802 A | 11/1999 | Shichijyo et al. | |
| 6,028,377 A | 2/2000 | Sakamoto | |
| 6,043,579 A | 3/2000 | Hill | |
| 6,060,810 A | 5/2000 | Lee et al. | |
| 6,066,906 A | 5/2000 | Kalsi | |
| 6,097,126 A | 8/2000 | Toshiyasu | |
| 6,121,712 A | 9/2000 | Sakamoto | |
| 6,133,655 A | 10/2000 | Suzuki et al. | |
| 6,133,669 A | 10/2000 | Tupper | |
| 6,137,202 A | 10/2000 | Holmes et al. | |
| 6,154,013 A | 11/2000 | Caamano | |
| 6,163,097 A | 12/2000 | Smith et al. | |
| 6,177,748 B1 | 1/2001 | Katcher et al. | |
| 6,181,035 B1 | 1/2001 | Acquaviva | |
| 6,194,799 B1 | 2/2001 | Miekka | |
| 6,229,238 B1 | 5/2001 | Graef | |
| 6,232,693 B1 | 5/2001 | Gierer et al. | |
| 6,236,131 B1 | 5/2001 | Schafer | |
| 6,300,702 B1 | 10/2001 | Jack et al. | |
| 6,365,999 B1 | 4/2002 | Mühlberger et al. | |
| 6,445,105 B1 | 9/2002 | Kliman et al. | |
| 6,448,687 B2 | 9/2002 | Higashino et al. | |
| 6,455,970 B1 | 9/2002 | Shafer et al. | |
| 6,472,792 B1 | 10/2002 | Jack et al. | |
| 6,492,758 B1 | 12/2002 | Gianni et al. | |
| 6,545,382 B1 | 4/2003 | Bennett | |
| 6,603,060 B1 | 8/2003 | Cammano | |
| 6,603,237 B1 | 8/2003 | Caamano | |
| 6,657,329 B2 | 12/2003 | Kastinger et al. | |
| 6,664,704 B2 | 12/2003 | Calley | |
| 6,707,208 B2 | 3/2004 | Durham et al. | |
| 6,717,297 B2 | 4/2004 | Sadarangani et al. | |
| 6,774,512 B2 | 8/2004 | Takagi et al. | |
| 6,794,791 B2 | 9/2004 | Ben Ahmed et al. | |
| 6,815,863 B1 | 11/2004 | Jack et al. | |
| 6,849,985 B2 | 2/2005 | Jack et al. | |
| 6,853,112 B2 | 2/2005 | Nakamura et al. | |
| 6,867,530 B2 | 3/2005 | Gamm et al. | |
| 6,879,080 B2 | 4/2005 | Cammano | |
| 6,885,129 B1 | 4/2005 | Oohashi et al. | |
| 6,924,579 B2 | 8/2005 | Calley | |
| 6,940,197 B2 * | 9/2005 | Fujita et al. | 310/156.43 |
| 6,949,855 B2 | 9/2005 | Dubois et al. | |
| 6,979,925 B2 | 12/2005 | Schwamm | |
| 6,989,622 B1 | 1/2006 | Chen et al. | |
| 7,015,603 B2 * | 3/2006 | Barrho et al. | 310/49.34 |
| 7,026,737 B2 | 4/2006 | Angerer et al. | |
| 7,030,529 B2 | 4/2006 | Dommsch et al. | |
| 7,030,534 B2 | 4/2006 | Cammano | |
| 7,064,469 B2 | 6/2006 | Jack et al. | |
| 7,067,954 B2 * | 6/2006 | Kuribayashi et al. | 310/263 |
| 7,071,593 B2 | 7/2006 | Matsushita et al. | |
| 7,126,313 B2 | 10/2006 | Dooley | |
| 7,129,602 B2 | 10/2006 | Lange et al. | |
| 7,135,802 B2 | 11/2006 | Seki et al. | |
| 7,208,856 B2 | 4/2007 | Imai et al. | |
| 7,211,922 B2 | 5/2007 | Isoda et al. | |
| 7,230,361 B2 | 6/2007 | Hirzel | |
| 7,245,055 B2 | 7/2007 | Jack | |
| 7,250,704 B1 | 7/2007 | Sortore et al. | |
| 7,358,639 B2 | 4/2008 | Cammano | |
| 7,385,329 B2 | 6/2008 | Hill | |
| 7,385,330 B2 | 6/2008 | Trzynadlowski et al. | |
| 7,420,312 B2 | 9/2008 | Kitamura et al. | |
| 7,466,057 B2 | 12/2008 | Imai et al. | |
| 7,592,735 B2 | 9/2009 | Hamada | |
| 7,602,095 B2 * | 10/2009 | Kusase et al. | 310/263 |
| 7,638,919 B2 | 12/2009 | Pulnikov et al. | |
| 2001/0001528 A1 | 5/2001 | Ragaly | |
| 2001/0030479 A1 | 10/2001 | Mohler | |
| 2001/0030486 A1 | 10/2001 | Pijanowski | |
| 2002/0070627 A1 | 6/2002 | Ward et al. | |
| 2002/0135242 A1 | 9/2002 | Kawai | |
| 2003/0122439 A1 * | 7/2003 | Horst | 310/154.11 |
| 2003/0122440 A1 * | 7/2003 | Horst | 310/181 |
| 2004/0061396 A1 | 4/2004 | Narita et al. | |
| 2004/0140730 A1 * | 7/2004 | Barrho et al. | 310/257 |
| 2004/0145269 A1 * | 7/2004 | Barrho et al. | 310/257 |
| 2004/0150288 A1 | 8/2004 | Calley | |
| 2004/0189138 A1 | 9/2004 | Jack | |
| 2004/0212267 A1 | 10/2004 | Jack et al. | |
| 2004/0232799 A1 | 11/2004 | Chen et al. | |
| 2004/0251759 A1 | 12/2004 | Hirzel | |
| 2004/0251761 A1 | 12/2004 | Hirzel | |
| 2004/0262105 A1 | 12/2004 | Li et al. | |
| 2005/0006978 A1 | 1/2005 | Bradfield | |
| 2005/0012427 A1 | 1/2005 | Seki et al. | |
| 2005/0062348 A1 | 3/2005 | Ohnishi et al. | |
| 2005/0121983 A1 | 6/2005 | Ehrhart | |

| | | | |
|---|---|---|---|
| 2005/0156479 A1 | 7/2005 | Fujita et al. | |
| 2005/0242679 A1 | 11/2005 | Walter et al. | |
| 2006/0012259 A1 | 1/2006 | Kerlin | |
| 2006/0012263 A1 | 1/2006 | Smith et al. | |
| 2006/0082237 A1 | 4/2006 | Kerlin | |
| 2006/0091755 A1 | 5/2006 | Carlisle | |
| 2006/0131974 A1 | 6/2006 | Sadarangani et al. | |
| 2006/0131986 A1 | 6/2006 | Hsu et al. | |
| 2006/0192453 A1 | 8/2006 | Gieras et al. | |
| 2006/0220477 A1 | 10/2006 | Okumoto et al. | |
| 2006/0261688 A1 | 11/2006 | Akita et al. | |
| 2007/0013253 A1 | 1/2007 | Dobois et al. | |
| 2007/0046137 A1 | 3/2007 | Ooiwa | |
| 2007/0046139 A1* | 3/2007 | Ishizuka | 310/263 |
| 2007/0075605 A1 | 4/2007 | Enomoto et al. | |
| 2007/0138900 A1 | 6/2007 | Imai et al. | |
| 2007/0152528 A1 | 7/2007 | Kang et al. | |
| 2007/0176505 A1 | 8/2007 | Trzynadlowski et al. | |
| 2008/0007126 A1 | 1/2008 | Popov et al. | |
| 2008/0169776 A1* | 7/2008 | Acker | 318/139 |
| 2008/0211326 A1 | 9/2008 | Kang et al. | |
| 2008/0265707 A1* | 10/2008 | Bradfield | 310/156.59 |
| 2008/0309188 A1 | 12/2008 | Calley | |
| 2008/0315700 A1* | 12/2008 | Ishikawa et al. | 310/156.66 |
| 2009/0206696 A1* | 8/2009 | Calley | 310/263 |
| 2009/0243406 A1 | 10/2009 | Jack et al. | |

FOREIGN PATENT DOCUMENTS

| | | |
|---|---|---|
| DE | 3626149 | 8/1986 |
| DE | 3602687 | 8/1987 |
| DE | 8711725 | 8/1987 |
| DE | 3927453 | 2/1991 |
| DE | 19634949 | 5/1998 |
| DE | 102006026719 | 6/2006 |
| EP | 0707374 | 4/1996 |
| EP | 0718959 | 6/1996 |
| EP | 0998010 | 3/2000 |
| EP | 1117168 | 7/2001 |
| EP | 1227566 | 7/2002 |
| EP | 1 063 754 B1 | 12/2007 |
| GB | 518298 | 9/1938 |
| GB | 2052176 | 1/1986 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | WO 2009116935 | 9/2009 |
| WO | WO 2009116936 | 9/2009 |
| WO | WO 2009116937 | 9/2009 |

OTHER PUBLICATIONS

Dubois, Maxime R. et al.; "Clawpole Transverse-Flux Machine with Hybrid Stator"; pp. 1-6.

Henneberger G. et al.; "On the Parameters Computation of a Single Sided Transverse Flux Motor"; May 26, 2001; pp. 35-40.

Husband, S.M. et al.; "The Rolls-Royce Transverse Flux Motor Development"; 2003; pp. 1435-1440.

Notice of Allowance dated Mar. 29, 2005 for U.S. Appl. No. 10/721,765.

Notice of Allowance dated Feb. 13, 2008 for U.S. Appl. No. 11/679,806.

Notice of Allowance dated May 30, 2003 for U.S. Appl. No. 10/273,238.

Notice of Allowance dated Nov. 3, 2009 for U.S. Appl. No. 12/149,931.

Office Action dated Sep. 28, 2007 for U.S. Appl. No. 11/679,806.

Notice of Allowance dated Dec. 30, 2009 for U.S. Appl. No. 12/149,931.

Office Action dated Sep. 13, 2004 for U.S. Appl. No. 10/721,765.

ISR/WO dated Aug. 15, 2008 for International Patent Application No. PCT/US2008/063301.

IPRP dated Nov. 10, 2009 for International Patent Application No. PCT/US2008/063301.

ISR/WO dated Aug. 20, 2008 for International Patent Application No. PCT/US2008/063236.

IPRP dated Nov. 17, 2009 for International Patent Application No. PCT/US2008/063236.

ISR/WO dated Oct. 24, 2008 for International Patent Application No. PCT/US2008/063336.

IPRP dated Nov. 17, 2009 for International Patent Application No. PCT/US2008/063336.

ISR/WO dated Aug. 15, 2008 for International Patent Application No. PCT/US2008/063287.

IPRP dated Nov. 10, 2009 for International Patent Application No. PCT/US2008/063287.

ISR/WO dated Nov. 10, 2009 for International Patent Application No. PCT/US2008/063268.

IPRP dated Nov. 10, 2009 for International Patent Application No. PCT/US2008/063268.

Technical Project Presentation—Development of a High-Performance Generator for Wind Turbines-by Andrzej M. Trzynadlowski, PhD, University of Nevada, Reno, FIEEE.

Technical Project Presentation—Development of a High-Performance Generator for Wind Turbines-Final Report-University of Nevada, Reno—Feb. 2004.

"Magnetic Field Calculation of Claw Pole Permanent Magnet Machines Using Magnetic Network Method", by Y.G. Guo et al., Faculty of Engineering, University of Technology, Sydney.

"Applications of Power Electronics in Automotive Power Generation",—by David J. Perreault et al., Laboratory for Electromagnetic and Electronic Systems, Massachusetts Institute of Technology, Jun. 21-22, 2006—Paris.

"Thermal Modeling of Lundell Alternators", IEEE Transactions on Energy Conversion, vol. 20, No. 1, Mar. 2005.

"Iron Loss Calculation in a Claw-Pole Structure", by A. Reinap et al., Lund University.

"Permanent Magnet Assisted Synchronous Reluctance Motor Design and Performance Improvement",—A Dissertation by Peyman Niazi, Texas A&M University, Dec. 2005.

"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

"Analysis of the Yokeless and Segmented Armature Machine", by Woolmer, MD, T.J., et al.—Electric Machines & Drives Conference, 2007. IEMDC apos; 07. IEEE International, May 3-5, 2007, pp. 704-708, vol. 1, Oxford University, Engineering Department, Parks Road, Oxford, UK.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2., Jun. 2006.

Fundamental Modeling for Optimal Design of Transverse Flux Motors—Genevieve Patterson et al., University of Tokyo.

www.higenmotor.com/eng/aboutus/about06read.asp?id=notice &no=87 dated Jan. 15, 2010.

Lyng Eltorque QT 800—2.0 User Manual, version 1.0—dated Jul. 3, 2007.

Motors: Emerging Concepts by George Holling, Apr. 2007.

www.iem.rwth-aachen.de/index.pl/new materials and machines?makePrintable=1; retrieved Jan. 15, 2010.

Raser Technologies Company Brochure.

Response to Office Action filed Jan. 15, 2010 for Japanese Patent Application No. 2003-548374.
Office Action dated Mar. 2, 2010 for U.S. Appl. No. 12/149,931.
Restriction Requirement dated Apr. 5, 2010 for U.S. Appl. No. 12/149,934.
Restriction Requirement dated Apr. 22, 2010 for U.S. Appl. No. 12/149,936.
Notice of Allowance dated May 4, 2010 for U.S. Appl. No. 12/149,931.
Technical Project Presentation—Development of a High-Performance Generator for Wind Turbines-by Andrzej M. Trzynadlowski, PhD, University of Nevada, Reno, FIEEE, Aug. 2007.
"Magnetic Field Calculation of Claw Pole Permanent Magnet Machines Using Magnetic Network Method": J. Elect. Electron. Eng., Australia, vol. 22, No. 1, pp. 69-75, 2002.
"Iron Loss Calculation in a Claw-Pole Structure", by A. Reinap et al., Lund University, Jun. 2004.
Dubois, Maxine R. et al.; "Clawpole Transverse-Flux Machine with Hybrid Stator"; pp. 1-6, Jul. 15, 2006.
Fundamental Modeling for Optimal Design of Transverse Flux Motors—Genevieve Patterson et al., University of Tokyo, 2008.
Raser Technologies Company Brochure, 2005.
ISR and WO dated Jun. 10, 2010 for International Application No. PCT/US2009/063145.
ISR and WO dated Jun. 10, 2010 for International Application No. PCT/US2009/063142.
ISR and WO dated Jun. 18, 2010 for International Application No. PCT/US2009/063147.
Office Action dated May 19, 2010 for U.S. Appl. No. 12/149,934.
Office Action dated Jul. 27, 2010 for U.S. Appl. No. 12/149,936.
Office Action dated Aug. 9, 2010 for U.S. Appl. No. 12/611,733.
Notice of Allowance dated Aug. 12, 2010 for U.S. Appl. No. 121611,728.
Notice of Allowance dated Aug. 19, 2010 for U.S. Appl. No. 121611,737.
Notice of Allowance dated Sep. 8, 2010 for U.S. Appl. No. 12/149,934.
Notice of Allowance dated Nov. 2, 2010 for U.S. Appl. No. 12/847,991.

* cited by examiner

ELECTRICAL DEVICES WITH REDUCED FLUX LEAKAGE USING PERMANENT MAGNET COMPONENTS

This application is a non-provisional of and claims priority to Applicant's U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, U.S. Provisional Patent Appl. No. 61/064,162 titled "ELECTRICAL OUTPUT GENERATING DEVICES AND DRIVEN ELECTRICAL DEVICES, AND METHODS OF MAKING AND USING THE SAME" filed Feb. 20, 2008, and U.S. Provisional Patent Appl. No. 61/064,161 titled "LAMINATE ROTOR OR STATOR ELEMENTS FOR ELECTRICAL OUTPUT GENERATING DEVICES AND DRIVEN ELECTRICAL DEVICES, AND METHODS OF MAKING AND USING SUCH ELEMENTS AND DEVICES" filed Feb. 20, 2008. This application is also related to U.S. patent application Ser. No. 12/149,931, now U.S. Pat. No. 7,800,275, titled "ELECTRICAL DEVICES USING ELECTROMAGNETIC ROTORS" filed May 9, 2008, U.S. patent application Ser. No. 12/149,933, now U.S. Patent Application Publication No. 2009/0208771, titled "POWDERED METAL MANUFACTURING METHOD AND DEVICES" filed May 9, 2008, U.S. patent application Ser. No. 12/149,934, now U.S. Patent Application Publication No. 2009/0206696, titled "ELECTRICAL DEVICES USING DISK AND NON-DISK SHAPED ROTORS" filed May 9, 2008, and U.S. patent application Ser. No. 12/149,936, now U.S. Patent Application Publication No. 2009/0208771, titled "ELECTRICAL DEVICES HAVING TAPE WOUND CORE LAMINATE ROTOR OR STATOR ELEMENTS" filed May 9, 2008. The entirety of each of the foregoing applications is hereby incorporated by reference herein.

BACKGROUND OF THE INVENTION

1. Field of the Invention

Aspects of the present invention relates to the field of alternator or other electrical output generating devices and to electric motors and other electrically driven devices, and in particular to electrical output generating devices and electrically driven devices, and methods of making and use thereof, that, among other things, improve efficiency of operation, provide higher torque density, and reduce costs and complexity of manufacture, while allowing greater flexibility in operation over related art devices.

2. Background of the Technology

Related art multipole windings for alternators and electric motors typically require complex winding machines and often complex geometry windings in order to meet size and power needs. This problem is generally higher with greater numbers of poles used. Greater numbers of poles have certain advantages, such as allowing higher voltage per turn, providing higher torque density, and producing voltage at a higher frequency.

There is an unmet need in the art for electrical output generating devices and electrically driven devices, and methods of manufacturing and use thereof, that improve efficiency of operation and reduce costs and complexity of manufacture, while allowing greater flexibility in operation over prior art devices.

SUMMARY OF THE INVENTION

Particular variations of electrical output generating devices in accordance with aspects of the present application may satisfy one or more of the above identified needs, as well as others, by providing electrical output generating devices and electrically driven devices, and methods of making and use thereof, that, among other things, improve efficiency of operation and reduce costs and complexity of manufacture, while allowing greater flexibility in operation over related art devices. Further, aspects of the present invention provide other advantages, such as enabling higher torque density to be obtained, a wide speed range to be used, and allowing selectability in location of stationary windings (e.g., allowing any windings within the device to be stationary; among other things, this feature may allow or ease use of supercooling features; in addition, this feature may allow the use of slip rings or other similar features to be avoided), while allowing connection convenience for other purposes, such as to facilitate use in conjunction with superconducting windings.

Particular aspects of the present invention provide a more economical to manufacture and/or more efficiently operating electrical output generating devices and electrically driven devices over related art devices. Among other things, some variations of the present invention overcome difficulties in manufacturing of many typical electrical output generating devices and electrically driven devices that use high numbers of and/or complex windings. In order to overcome problems with complex windings, among other things, aspects of the present invention provide for methods and features to allow flux paths to be used in operation, via flux conducting materials, rather than using complex winding paths.

In an exemplary variation, a rotor portion having a plurality of magnetic pole portions for conducting flux encompasses an input coil. The rotor is operated in conjunction with a plurality of flux conducting material portions in a stator portion that nestably encompasses the rotor portion. The relative positions of the stator and rotor may be moved relative to one another to change the gap therebetween, and, thus, to allow adjustment of power generated (for alternator operation, for example) or used/output for motor operation. The stator portion further encompasses an output coil portion. In the first exemplary variation, the rotor portion is moveable, such that corresponding flux conducting material portions may generally be variably located in close proximity to one another. Among other things, this arrangement allows both field and output coils to be small in diameter (e.g., thereby having lower resistance), while allowing the flux conductors to be positioned as far as possible from the rotational center of the device (e.g., thereby allowing larger poles for transmitting greater flux, with wider spacing so as to reduce flux leakage).

When operating as an electrical output device, energizing of the input coil portion produces travel of flux in a flux path, as the rotor is rotated, through the flux conducting portions of the rotor and stator, which, in turn, produces electrical output from the output coil portion; or, alternatively, when operated as an electrically driven device, the output coil portion is energized in a manner so as to produce motion of the rotor via the flux traveling in the flux path. Among other things, the use of flux conducting material portions in the stator, rather than wire coils of the related art, allows greater numbers of poles to be used more easily over the related art using coils for transmitting flux, while minimizing complexity and other drawbacks of use of coils for this purpose.

Further, for example, the configuration of the first exemplary variation decouples the number of poles from the physical area required for windings. In the related art using multiple windings for poles, for example, if the pole count is increased, the corresponding area available for each phase (e.g., for windings) is decreased. In contrast, with the first exemplary variation of the present invention, the number of poles is not limited by restrictions on physical space for windings. Among other things, aspects of the present invention thereby allow much higher numbers of poles to be used (e.g., where optimal), with corresponding contribution to higher power density over such related art approaches.

The configuration of the first exemplary variation also allows the length of the output wire for the windings, for example, to be much shorter than related art multiple winding approaches allow. This advantage is obtainable, for example, because such windings doe not have to thread around each pole, but only around a central pole. Among other things, this additional advantage allows much lower resistance power coils to be achieved, thereby producing higher efficiency and further reducing cost over related art multiple winding devices.

A second exemplary variation of the present invention relates to a device similar to that of the first exemplary variation, but includes added magnetic portions and additional flux conducting portions. The added magnetic portions can serve to insulate, at least partially, flux leakage between adjacent flux conducting portions, thereby allowing the air gap present in the device of the first variation to be greatly reduced, thereby increasing output of the device of the second variation, relative to the first variation. Further, the presence of the magnets allows operation at a reduced output without energizing the coil for producing electromagnets in the stator portion.

Additional advantages and novel features relating to electrical output generating devices and/or electrically driven devices will be set forth in part in the description that follows, and in part will become more apparent to those skilled in the art upon examination of the following or upon learning by practice of aspects of the present invention.

DETAILED DESCRIPTION

Aspects of the present invention and implementations thereof are not limited to the specific components or assembly procedures disclosed herein. Many additional components and assembly procedures known in the art consistent with the intended electrical output generating devices, electrically driven devices, and/or assembly procedures for electrical output generating devices and/or electrically driven devices will become apparent for use with particular variations and implementations discussed herein. Accordingly, for example, although particular electrical output generating devices and/or electrically driven devices are disclosed, such electrical output generating devices and/or electrically driven devices and implementing components may comprise any shape, size, style, type, model, version, measurement, concentration, material, quantity, and/or the like usable for such electrical output generating devices and/or electrically driven devices and implementing components, consistent with the intended operation of electrical output generating devices and/or electrically driven devices.

Description of exemplary variations and implementations of electrical output generating devices and/or electrically driven devices in accordance with aspects of the present invention will now be made with reference to the appended drawings.

Device with Reduced Flux Leakage

One factor in device performance for electrical output generating devices and/or electrically driven devices in accordance with aspects of the present invention is the amount of flux leakage that occurs. One practical effect of flux leakage is that current can become limited; the device therefore can have the appearance of operating "reactively," to limit power density. Among other things, in order to reduce this reactive, flux leakage effect, the device of a first exemplary variation of the present invention, as shown in FIGS. 1-4 includes features in the rotating and fixed portions of the flux conducting material so as to reduce flux leakage.

Figure 1:
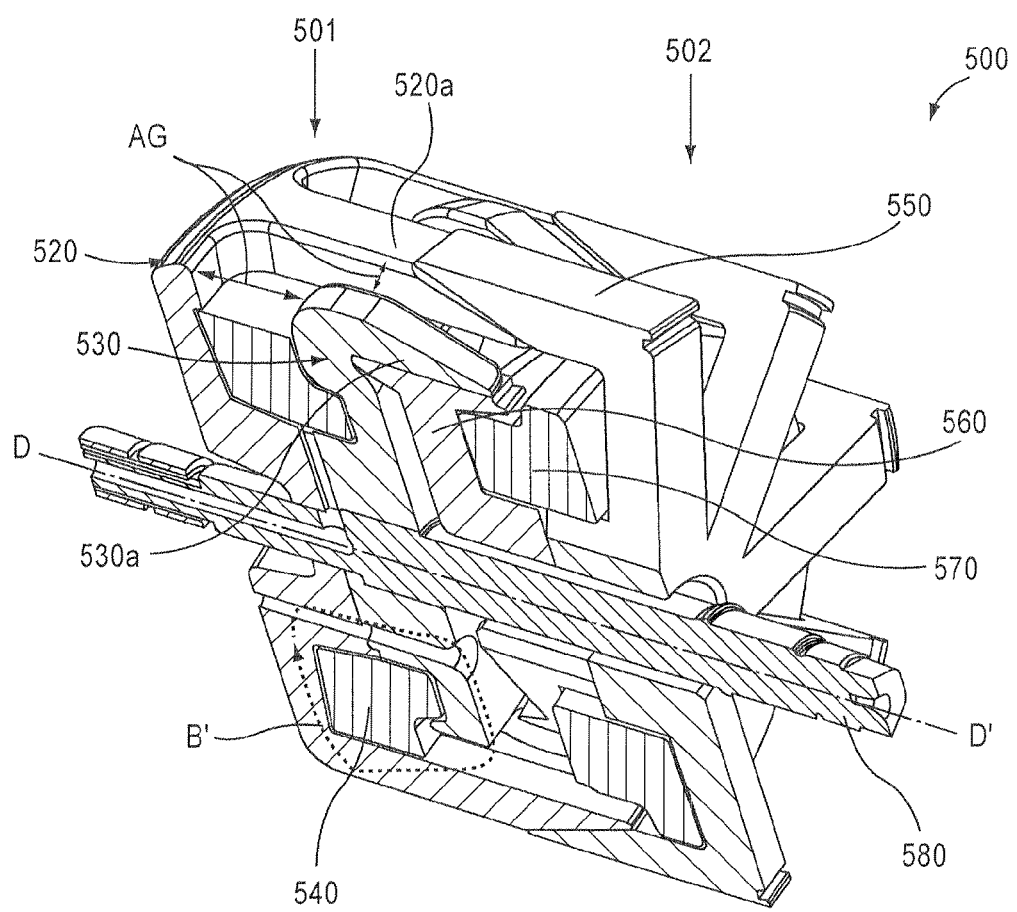
FIG. 1 shows the internal components of an exemplary electrical output device or electrically driven device in an assembled view, in accordance with a aspects of the present invention.

FIG. 1 shows the internal components 500 for a first exemplary device in an assembled view, in accordance with aspects of the present invention. Such a device is likewise usable in many driven rotation applications to produce electrical output, such as for use with an automobile engine. Although variations shown herein generally have an electromagnet or permanent magnets on the rotator portion and flux conducting extensions on the stator, it should be noted that other, unshown configurations are also part of this invention. For example, flux conductive extensions can be mounted onto the rotor and an electromagnet onto the stator portion substantially reversing a configuration shown herein. Alternatively, flux conductive extensions can be mounted onto the rotor and a series of permanent magnets onto the stator portion substantially reversing another configuration shown herein. A number of other relationships between the stator and rotator are possible, not limited to mounting either the stator or the rotor as the exterior-most component or rearranging electromagnets and flux conductive extensions in order to conduct magnetic flux in such a way as to either generate electrical output or to drive the rotator. In addition, flux conductive extensions and either permanent or electromagnets can be mounted to the same component, i.e., to the rotor or stator assembly.

As shown in FIG. 1, in this first exemplary variation, a first, rotating portion 501 and a second, stationary portion 502 of the internal components 500 of the device are in some ways similar in design and operation to those of the embodiment of FIGS. 1-3B of Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007 and application Ser.

No. 12/149,931 titled "ELECTRICAL OUTPUT GENERATING DEVICES AND DRIVEN ELECTRICAL DEVICES USING ELECTROMAGNETIC ROTORS, AND METHODS OF MAKING AND USING THE SAME" filed May 9, 2008, and are usable, for example, in many typical automobile alternator and/or electric motor applications, among others. However, in the first embodiment of FIGS. 1-4 of the present application, the rotating portion 501 does not nestably rotate within (e.g., is not primarily encompassed within) the stationary portion 502.

As shown in FIG. 1, the rotating portion 501 includes first magnetic pole portions (e.g., north magnetic poles) 520 and second magnetic pole portions (e.g., south magnetic poles) 530. The first and second magnetic pole portions 520, 530 encompass an internal coil portion 540, such as a coiled wire. The internal coil portion 540 receives an energizing current (e.g., a fixed current, such as a direct current or DC). As a result of the energizing current in the coil portion 540, a flux is produced through the center of the coil portion 540 and about the outside of the coil portion, or a flux is otherwise produced, such as through the use or motion of permanent magnets (not shown in this variation). Each of the first and second magnetic pole portions 520, 530 includes a plurality of poles 520a, 530a, respectively, such that a multiple pole rotor (e.g., 18 alternating polarity poles 520a, 530a) is created by the combination of the first and second magnetic pole portions 520, 530. By using such magnetic poles 520a, 530a, this approach produces an alternating flux when moving past a point (e.g., when operated as an electrical output device). However, among other advantages, the approach shown in FIGS. 1-4 simplifies manufacturing over a multiple wound coil approach of the related art, since, among other things, many small diameter coils in close proximity to one another are not required.

Figure 2:
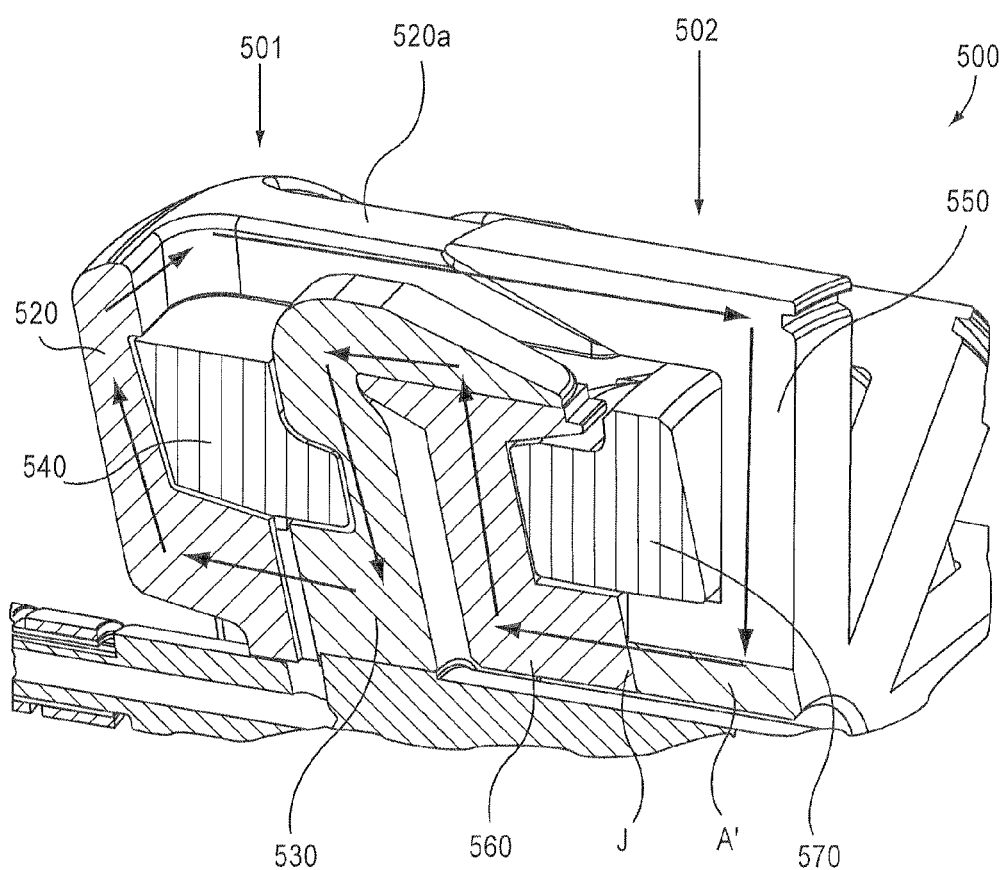
FIG. 2 is a partial cutaway view of the exemplary electrical output device or electrically driven device of FIG. 1.

As further shown in FIGS. 1-4, in this first exemplary variation, the second, stationary portion 502 of the internal components 500 of the device 800 includes a first laminated steel or other flux conducting material portion 550 and an output coil 570. As shown, for example, in FIGS. 1 and 2, in a first rotated position of the rotating portion 501 relative to the stationary portion 502, the first flux conducting portion 550 aligns with a corresponding pole 520a of the first magnetic pole portion 520. As shown in the partial cutaway view of FIG. 2, the first flux conducting portion 550 partially wraps around a first portion of the output coil 570 to form a portion of flux path A', having flux, for example, in the direction of the arrowheads, that continues from the aligned first magnetic pole portion 520. Note that the first flux conduction portion 550 abuts a second flux conducting portion 560, as shown in FIG. 2, at an abutting junction J. Flux path A is such that the magnetic flux is directed through the abutting junction J. The second flux conducting portion 560 continues the flux path A' through the center of the output coil 570. In the position of the rotating portion 501 shown in FIG. 2, the flux path A' then continues from the second flux conducting portion 560, which is aligned with the second magnetic pole portion 530, into the first magnetic pole portion 520, the first and second magnetic pole portions 520, 530 partially encircling the internal coil portion 540, and the first magnetic pole portion 520 continuing the flux path A' back into the first flux conducting portion 550, such that a completed flux path A' is formed.

Figure 3:
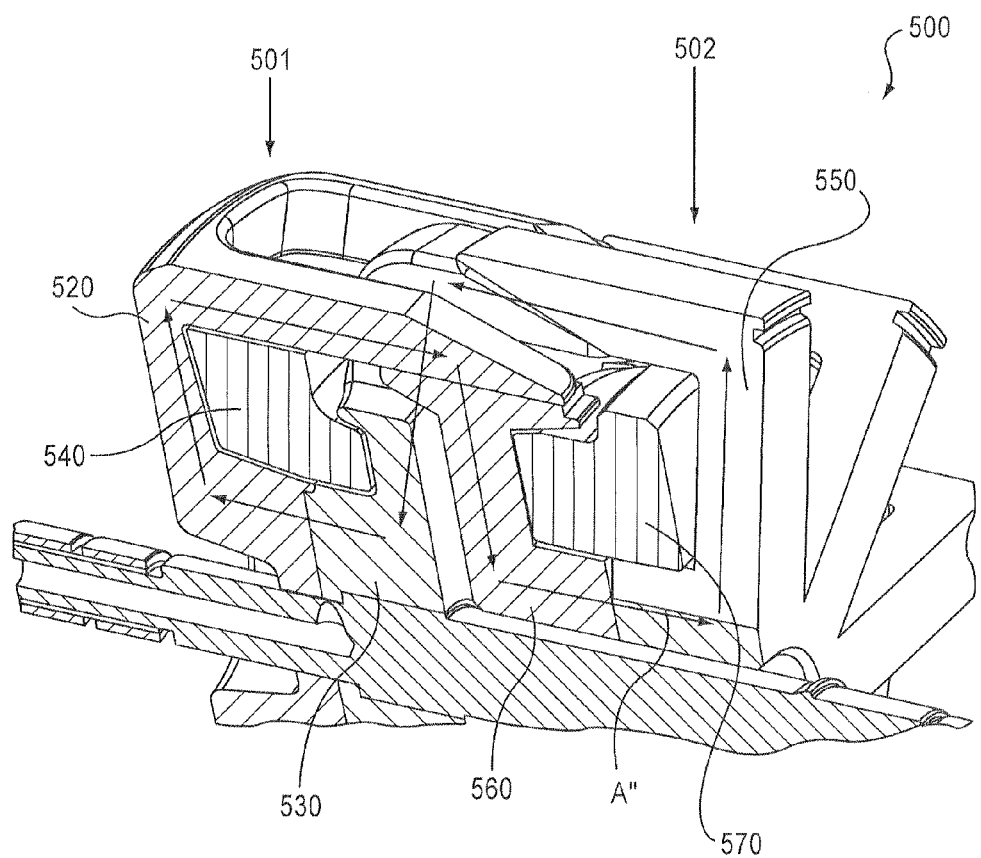
FIG. 3 is a partial cutaway view of the exemplary electrical output device or electrically driven device of FIG. 1, with rotated rotor relative to the stator for the view of FIG. 2.

In further operation, as shown in FIG. 3, as the rotating portion 501 rotates, the first flux conducing portion 550 eventually aligns with the second magnetic pole portion 530, and, due to the opposite polarity of the second magnetic pole portion 530 to the first magnetic pole portion 520, the direction of the flux path A" reverses, as shown by the arrowheads, relative to the direction of the flux path A' shown in FIG. 2.

The rotation of the rotating portion 501 and the travel of the flux about the flux paths A', A" formed by the aligning portions of the rotating portion 501 and the stationary portion 502 produces a varying flux through the output coil portion 570, such that a varying output is produced from the coil portion 570. This output, when the device is operated, for example, as an electrical output device, may be generally sinusoidal or otherwise alternating in character. The output may be produced, for example, though wire leads connected to the coil portion 570 to provide an alternating current (AC) output for use in a selected application, such as to assist in operating an automobile engine and/or charge a battery (e.g., by rectifying the AC output into DC current).

In addition to other advantages, implementing the principles of this particular variation of the present invention may include minimizing flux leakage between the adjacent magnetic pole portions 520, 530 and flux conducting material portions 550, 560. This result is due at least in part to the reduced length of closely proximate overlapping adjacent magnetic pole portions 520, 530 and flux conducting material portions 550, 560 generally in a direction parallel to the direction D-D' of the axis of the shaft 580 of the device 500 relative to some embodiments shown in Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007 and application Ser. No. 12/149,936 titled "ELECTRICAL OUTPUT GENERATING DEVICES AND DRIVEN ELECTRICAL DEVICES HAVING TAPE WOUND CORE LAMINATE ROTOR OR STATOR ELEMENTS, AND METHODS OF MAKING AND USE THEREOF" filed May 9, 2008. For example, as shown in FIG. 2, flux through the first flux conducting material portion 550 does not travel along an adjacent path to flux through the second flux conducting material portion 560. In addition, neither the first flux conducting material portion 550 nor the second flux conducting material portion 560 is aligned with and overlapping along its length with either the first magnetic pole portion 520 or the second magnetic pole portion 530.

Figure 4:
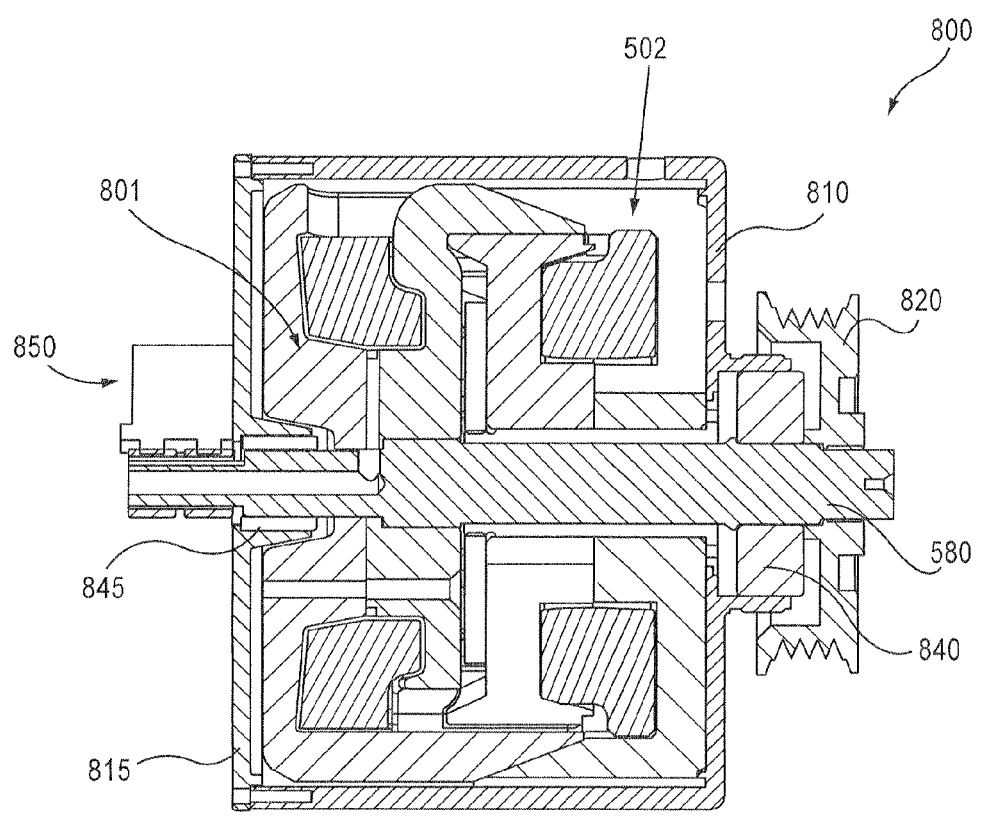
FIG. 4 is a cross-sectional view of an assembled exemplary electrical output device or electrically driven device having the internal components shown in FIGS. 1-3 and external and other components, in accordance with aspects of the present invention.

FIG. 4 is a cross-sectional view of an assembled exemplary device 800 having the internal components shown in FIGS. 1-3 and external and other components. As shown in the view of FIG. 4, the fully assembled device 800 includes one or more housing portions 810, 815; an input rotational power pulley 820 for producing rotation of the rotating portion 501, in turn attached to a shaft 580 (the rotational power to rotate the input pulley 820 can be provided, for example, by a combustion engine having an output pulley operatively coupled, such as via a belt, to the input pulley 820); one or more friction reducing portions 840, 845, such as bearings and/or bushings, for rotationally slidably allowing the shaft 580 to rotate within the housing portions 810, 815; and fan components and/or other features, such as brush related portions and features 850.

Device with Reduced Flux Leakage and Including Permanent Magnet Features

Figure 5:
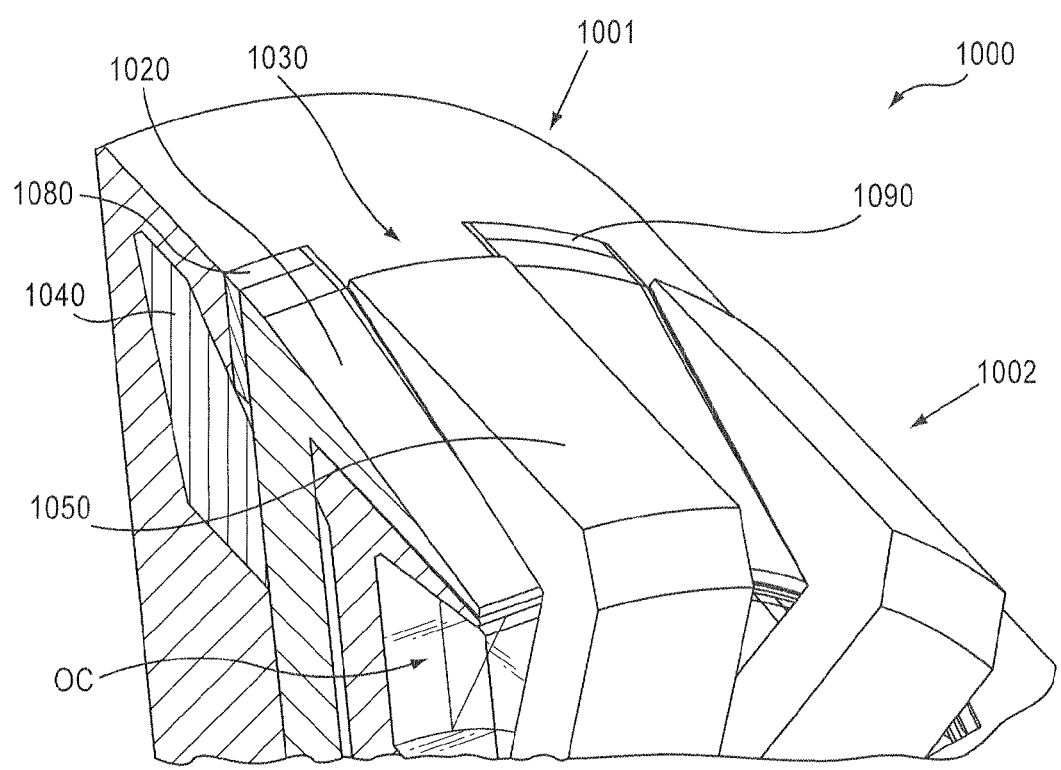
FIGS. 5 and 6 present views of portions of a device in accordance with a second exemplary variation of the present invention.
Figure 6:
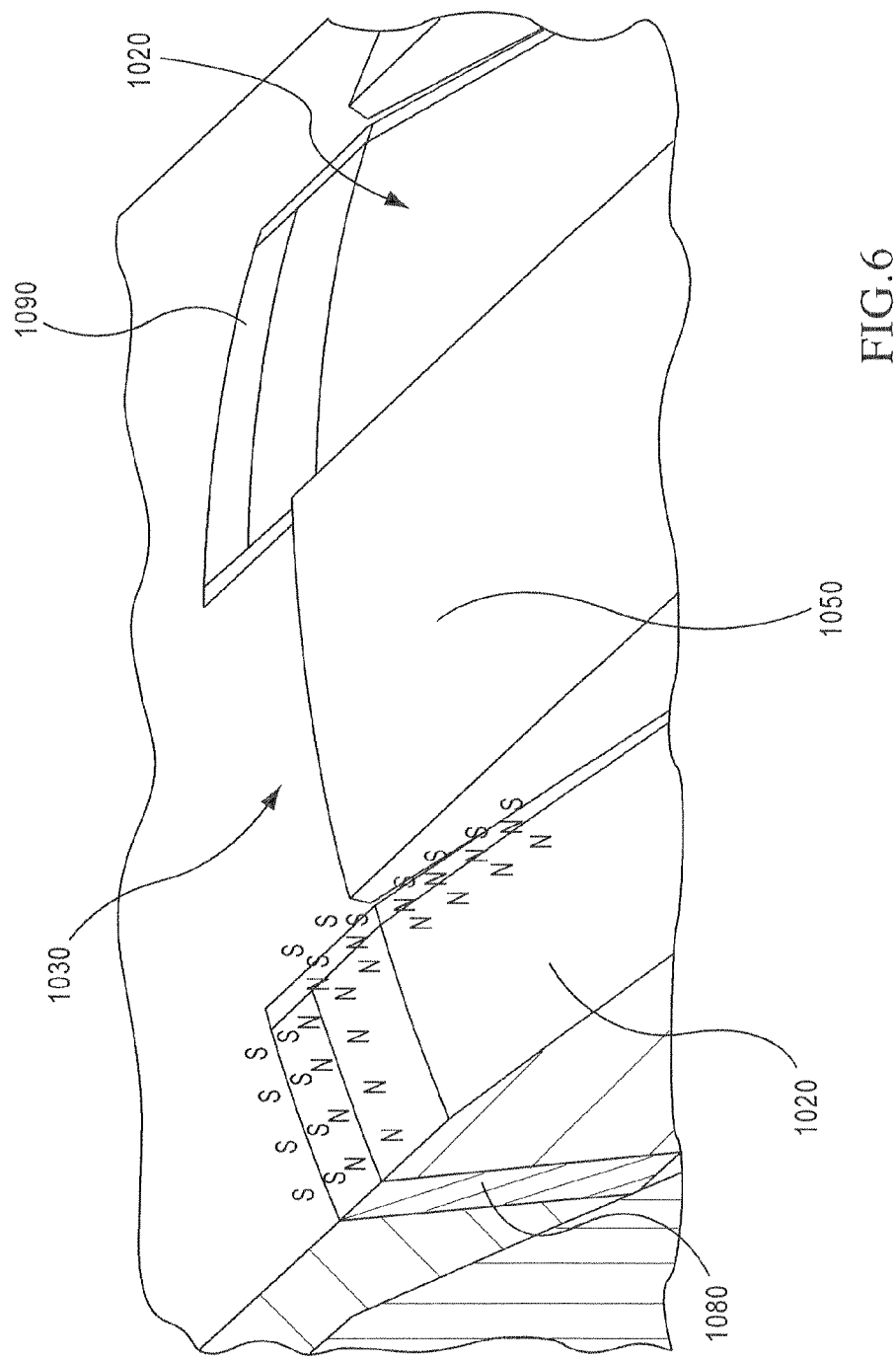

FIGS. 5 and 6 present views of portions of a device 1000 in accordance with a second exemplary variation of the present invention.

In the view shown in FIG. 5, a first, rotating portion 1001 (also interchangeably referred to herein as a "commutating flux switch portion") and a second, stationary portion 1002 of the internal components of the device 1000 are in some ways similar in design and operation to those of the embodiment of FIGS. 1-4. However, in contrast to the variation of FIGS. 1-4 of the present application, additional magnetic and flux conducting portions are provided within the rotating portion 1001.

As shown in FIG. 5, the commutating flux switch portion 1001 includes first induced magnetic pole portions (e.g., north magnetic poles) 1020 and second magnetic pole portions (e.g., south magnetic poles) 1030. The first and second magnetic pole portions 1020, 1030 encompass an internal coil portion 1040, such as a coiled wire or tape-wound coil. The internal coil portion 1040 receives an energizing current (e.g., a fixed current, such as a DC current). As a result of the energizing current in the coil portion 1040, a flux is produced through the center of the coil portion 1040 and about the outside of the coil portion. Each of the first and second magnetic pole portions 1020, 1030 makes up a multiple pole rotor (e.g., 18 alternating polarity poles 1020, 1030). By using such magnetic pole portions 1020, 1030, an alternating flux is created when moving past a point (e.g., when operated as an electrical output device).

As further shown in FIG. 5, in this second exemplary variation, the second, stationary portion 1002 of the device 1000 includes a first laminated steel or other flux conducting material portion 1050 surrounding an output coil (such as a coil located in the area OC shown in FIG. 5).

In operation, when the coil 1040 is energized, rotation of the commutating flux switch portion 1001 causes the pole portions 1020, 1030 alternately to be aligned with the flux conducting material portions 1050 of the stationary portion 1002 of the device 1000. This operation produces alternating flux travel through a flux path that varies with position.

In addition to the features and operation described above, the second exemplary variation further includes permanent magnet portions 1080, 1090 that separate each pair of adjacent pole portions 1020, 1030 and are oriented so as to enhance flux therethrough. For example, as shown in the closeup view of FIG. 6, if the pole portion 1020 is a north pole (as indicated by the "N" markings within the pole portion 1020) and the pole portion 1030 is a south pole (as indicated by the "S" markings within the pole portion 1030), as a function of the energized coil 1040, the magnet portions 1080, 1090, are each sandwiched between the pole portions 1020, 1030 and oriented such that the surface adjacent the pole portion 1020 is of a first polarity (e.g., "N") and the surface adjacent the pole portion 1030 is of a second polarity (e.g., "S"), so as to enhance flux in the direction induced by the coil 1040.

It should be noted that, although the magnetic pole portions 1080, 1090 are shown in FIG. 5 are a particular variation of the invention, they can also be added to minimize flux leakage on other variations of the invention and to other devices electrical output generating and driven electrical devices as well. For example, magnetic pole portions such as 1080 and 1090 can be added to the corresponding portions of each embodiment shown in of Applicant's co-pending U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007 and application Ser. No. 12/149,931 titled "ELECTRICAL OUTPUT GENERATING DEVICES AND DRIVEN ELECTRICAL DEVICES USING ELECTROMAGNETIC ROTORS, AND METHODS OF MAKING AND USING THE SAME" filed May 9, 2008. Such magnetic pole portions can be used with any of the variations of this invention discussed in this or in related applications, as well as similar devices in which minimizing flux loss is advantageous.

The magnet portions 1080, 1090 serve several purposes, including the following. First, the orientation of the magnet portions 1080, 1090 can enhance flux through the pole portions 1020, 1030. Alternatively, if the coil 1040 is not energized, the magnet portions 1080, 1090 may alone induce flux through the pole portions 1020, 1030 so as to induce some degree of output from the device 1000. Second, the magnet portions 1080, 1090 serve to hinder flux leakage between pole portions 1020, 1030 and fully or partially insulate the pole portions 1020, 1030 with respect to flux leakage. Without the magnet portions 1080, 1090, flux leakage between adjacent pole portions 1020, 1030 can lead to substantial loss of efficiency in the device and potential problems such as overheating. Similarly, in other variations in which the stator contains an electromagnet (not shown) the stator may have magnet portions that, like magnet portions 1080, 1090 of the rotor in FIG. 5, are placed between pole portions in order to hinder flux leakage. Although not shown, magnetic portions such as those in the variation of the invention in FIG. 5 can also be used to prevent flux leakage between flux conducting components in the device or other devices that are not necessarily part of an electromagnet.

Among other things, the flux insulating properties of the magnet portions 1080, 1090 allow more extensive use of flux conducting materials in the commutating flux switch portion 1001 than, for example, the embodiment of FIGS. 1-4, thereby allowing greater potential flux to be transmitted therethrough, and, as a result, greater output to be produced by the device 1000.

For example, as shown in FIG. 1, each of the plurality of poles 520a, 530a is physically separated from adjacent poles by an air gap AG, of varying dimensions as indicated, so as to reduce flux leakage between adjacent poles (e.g., between poles 520a and 530a, as shown in FIG. 1). The air gap AG thereby essentially reduces the amount of flux conducting material making up the magnetic pole portions 520, 530, thereby potentially reducing the flux therethrough and the potential output of the device 800. In contrast, as shown in FIGS. 5 and 6, little or no air gap exists between pole portions 1020 and 1030; the magnet portions 1080, 1090 serve the air gap purpose and can even add to flux conducted through the pole portions 1020, 1030 by creating a greater diameter path. Since no significant air gap is needed, greater flux conducting material is incorporated (e.g., in commutating flux switch portion 1001), allowing greater flux and potentially greater output for a similarly sized device 1000 to the device 500 shown in FIGS. 1-3.

Operation of the exemplary device of FIGS. 5 and 6 will now be further described. In a first operational mode, the coil 1040 is not energized. Output from the device 1000 is produced via the magnet portions 1080, 1090 inducing flux through the pole portions 1020, 1030 and the flux conducting material portions 1050 when proximate thereto. In this operational mode, relatively modest output may be produced, such as electrical alternator output for low demand vehicle electrical operations (e.g., normal, low demand vehicle electrical loads).

In a second operational mode, an energizing DC current is supplied to the coil 1040, thereby producing a flux through the pole portions 1020, 1030 and the flux conducting material portions 1050, when proximate thereto, in addition to the flux produced by the magnet portions 1080, 1090. When the coil 1040 is fully energized, for example, the device 1000 may function as a full power alternator for all vehicle operations (including providing sufficient output for all vehicle electrical demands, including high demand functions (e.g., vehicle headlights)).

In addition, a variable output between that produced by the magnet portions 1080, 1090 alone and that of the fully energized coil may be produced by energizing the coil 1040 at less than a full power level. Among other things, the variable output approach can produce increased operational efficiency (e.g., for a vehicle) by only providing electrical power as needed, thereby only requiring a load to produce the output as needed (e.g., rather than requiring a continuous load, such as is needed for many existing types of alternators).

Example variations and implementations of aspects of the present invention have now been described in accordance with the above advantages. It will be appreciated that these examples are merely illustrative of the invention. Many variations and modifications will be apparent to those skilled in the art.

In places where the description above refers to particular implementations of electrical output generating devices and/or electrically driven devices, it should be readily apparent that a number of modifications may be made without departing from the spirit thereof and that these aspects, implementations, and variations may be applied to other electrical output generating devices and/or electrically driven devices. The presently disclosed aspects, implementations, and variations are therefore to be considered in all respects as illustrative and not restrictive.

The invention claimed is:

1. An electrical machine, comprising:
   a rotor coil;
   a rotor assembly, the rotor assembly at least partially surrounding the rotor coil, being rotational about an axis, and having first and second sets of rotor extensions, each rotor extension having a top rotor extension surface and a bottom rotor extension surface;
   wherein each rotor extension has an attached permanent magnet component to hinder direct magnetic flux conduction between the rotor extension surfaces of other proximate rotor extensions;
   a stator assembly engageable with the rotator assembly, the stator assembly having a first and a second set of stator flux conductor extensions, each of the stator flux conductor extensions having a stator conductor surface; and
   a stator coil, the stator coil being at least partially encompassed by the stator assembly;
   wherein each stator flux conductor extension has a rotator end and an interior end, the rotator end having the stator conductor surface and the interior ends of the first set of stator flux conductor extensions abutting the interior ends of the second stator flux conductor extensions at an abutting junction;
   wherein the rotor assembly is rotatable about the axis between a first and a second position;
   wherein, in the first position, each of the top rotor extension surfaces of the first set of rotor extensions faces one of the stator conductor surfaces of the first set of stator flux conductor extensions and each of the bottom rotor extension surfaces of the second set of rotor extensions faces one of the stator conductor surfaces of the second set of stator flux conductor extensions, such that magnetic flux is conductable across the abutting junction in a first direction; and
   wherein, in the second position, each of the top rotor extension surfaces of the second set of rotor extensions faces one of the stator conductor surfaces of the first set of stator flux conductor extensions and each of the bottom rotor extension surfaces of the first set of rotor extensions faces one of the stator conductor surface of the second set of stator flux conductor extensions, such that magnetic flux is conductable across the abutting junction in a second direction that is substantially anti-parallel with the first direction.

2. The electrical machine of claim 1, wherein each of the permanent magnet components substantially covers at least a portion of each rotator extension surface.

3. The electrical machine of claim 1, wherein the direction of the top rotor extension surfaces and the direction of the stator conductor surfaces of the first set of stator flux conductor extensions form an oblique angle with respect to the direction of the axis.

4. The electrical machine of claim 3, wherein the bottom rotor extension surfaces and the stator conductor surfaces of the second set of stator flux conductor extensions are substantially parallel to the direction of the axis.

5. The electrical machine of claim 1, wherein each of the stator flux conductor extensions comprises a separate piece.

6. The electrical machine of claim 1, wherein at least one of the rotor coil or the stator coil comprises tape wound material.

7. The electrical machine of claim 1, wherein the stator comprises at least one of laminated steel, powdered metal, or amorphous metal.

8. An electrical machine, comprising:
   a stator coil;
   a stator assembly, the stator assembly at least partially surrounding the stator coil and having first and second sets of stator extensions, each stator extension having a top stator extension surface and a bottom stator extension surface;
   wherein each stator extension has an attached permanent magnet component to hinder direct magnetic flux conduction between the stator extension surfaces of proximate stator extensions;
   a rotor assembly fluxably engageable with the stator assembly and rotational about an axis, the rotor assembly having a first and a second set of rotor flux conductor extensions, each of the rotor flux conductor extensions having a rotor conductor surface; and
   a rotor coil, the rotor coil being at least partially encompassed by the rotor assembly;
   wherein each rotor flux conductor extension has a stator end and an interior end, the stator end having the rotor conductor surface and the interior ends of the first set of rotor flux conductor extensions abutting the interior ends of the second rotor flux conductor extensions at an abutting junction; wherein the rotor assembly is rotatable about the axis between a first and a second position;
   wherein, in the first position, each of the top stator extension surfaces of the first set of stator extensions faces the rotor conductor surfaces of one of the first set of rotor flux conductor extensions and each of the bottom rotor extension surfaces of the second set of stator extensions faces the rotor conductor surface of one of the second set of rotor flux conductor extensions, such that magnetic flux is conductable across the abutting junction in a first direction; and
   wherein, in the second position, each of the top stator extension surfaces of the second set of stator extensions faces one of the rotor conductor surfaces of the first set of rotor flux conductor extensions and each of the bottom stator extension surfaces of the first set of stator extensions faces one of the stator conductor surface of the second set of rotor flux conductor extensions, such that magnetic flux is conductable across the abutting junction in a second direction that is substantially anti-parallel with the first direction.

9. The electrical machine of claim 8, wherein each of the permanent magnet components substantially covers at least a portion of one of the stator extension surfaces.

10. The electrical machine of claim 8, wherein each of the top stator extension surfaces has a direction of orientation and each of the rotor conductor surfaces of the first set of rotor flux conductor extensions has a direction of orientation that forms an oblique angle with respect to the direction of the axis.

11. The electrical machine of claim 8, wherein each of the bottom stator extension surfaces has a direction of orientation and each of the rotor conductor surfaces of the second set of rotor flux conductor extensions has a direction of orientation substantially parallel to the direction of the axis.

12. The electrical machine of claim 8, wherein each of the rotor flux conductor extensions comprises a separate piece.

13. The electrical machine of claim 8, wherein at least one of the rotor coil or the stator coil comprises tape wound material.

14. The electrical machine of claim 13, wherein the tape wound material comprises amorphous metal.

15. The electrical machine of claim 8, wherein the rotor comprises at least one of laminated steel, powdered metal, or amorphous metal.

\* \* \* \* \*